May 9, 1967    N. M. STEELE ET AL    3,318,018
COOLING AND PROTECTIVE MEANS FOR PRINTED WEB MATERIAL
Filed Dec. 31, 1964
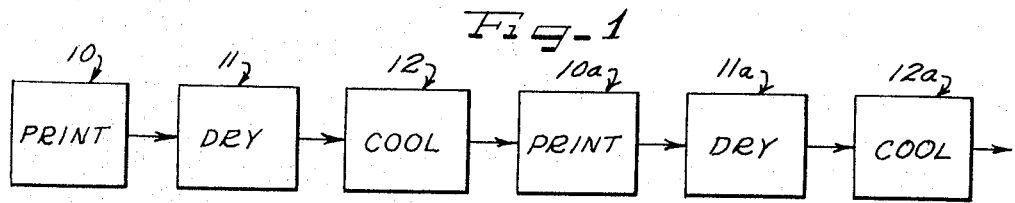
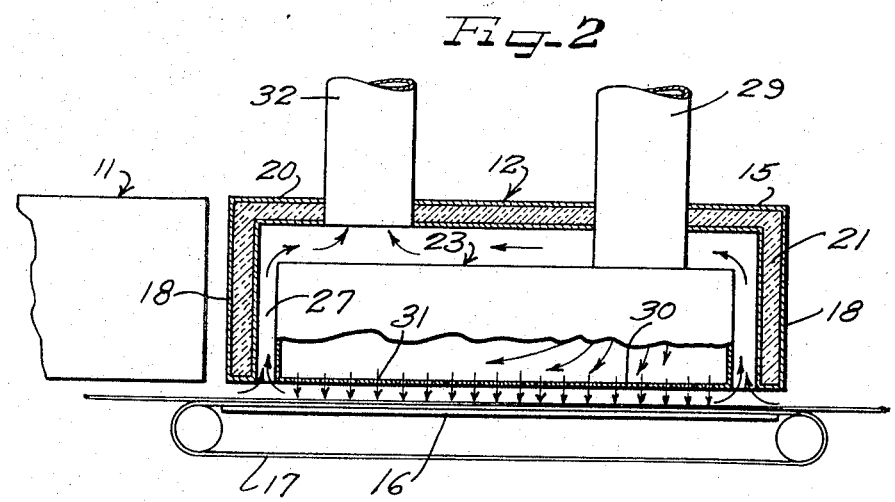
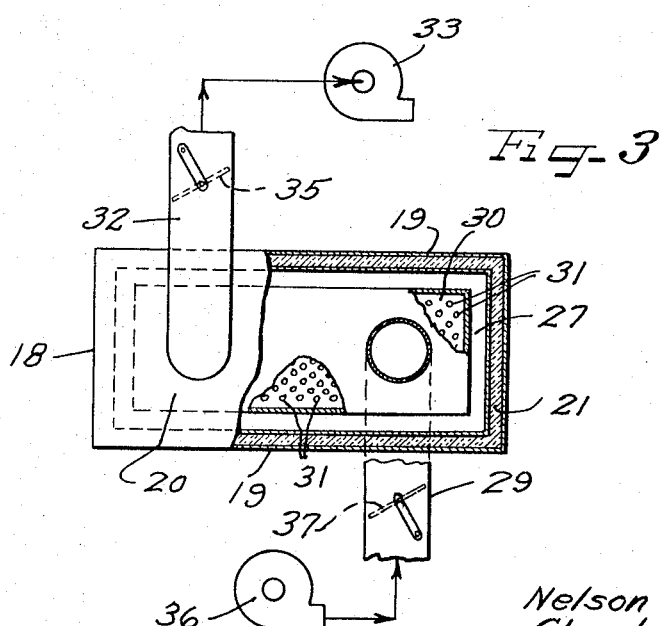
INVENTORS
Nelson M. Steele
Charles P. Lake United States Patent Office 3,318,018
Patented May 9, 1967

3,318,018
COOLING AND PROTECTIVE MEANS FOR PRINTED WEB MATERIAL
Nelson M. Steele, Beloit, Wis., and Charles Rodman Lake, Warrensville Heights, Ohio, assignors to Beloit Corporation, Beloit, Wis., a corporation of Wisconsin
Filed Dec. 31, 1964, Ser. No. 422,645
3 Claims. (Cl. 34—62)

This invention relates to methods and apparatus for drying freshly coated printing ink.

Paper and other articles are commonly coated with printing ink, by the letterpress, offset, flexographic, gravure, roll coat, reverse roll coat, plate coating, air knife coating, bar coating and curtain coating processes. In such printing processes and particularly in color printing, the ink is usually dried in the dryer and then passed to the atmosphere at room temperature or passed over a chill roll, and the article having a first printed coating thereon is then passed to a second printing stage.

In the drying of the ink the temperature of drying must be high enough to volatilize the aliphatic petroleums and drive off the volatilize aliphatic petroleums during the drying operation. The resins and pigment in the ink, however, turn fluid or plastic at far lower temperatures than the temperatures of volatilization of the aliphatic petroleums. The resins are thus frequently burned off by the high drying temperatures and redeposited on the press platen in a second stage of printing in the form of a residue.

The temperature of volatilization of the aliphatic petroleum is between 440 and 590° F. while the resins in the pigment turn fluid or plastic at temperatures between 200 and 330° F. The relatively high temperature of volatilization of the aliphatic petroleums and the low temperature at which the resins turn fluid or plastic, therefore, presents a dilemma in the drying of printing ink, particularly in color printing processes, and in prior printing processes the resins and pigment are frequently burned off as condensate and redeposited on the press rolls or platen in the form of a residue. This impairs the color and appearance of the finished product as well as making it necessary to more frequently clean subsequent equipment and rolls, which has not been satisfactorily remedied by passing the printed article over chill rolls.

The high drying temperature also creates a moisture loss in the printed article, which frequently results in a bone dry web or article, which is difficult to handle in further operations.

A principal object of the present invention, therefore, is to remedy the foregoing deficiencies in printing by immediately cooling the ink coating after the drying thereof by impinging cooled air on the coating, to thereby prevent the burning off of the resins as condensate, and the redepositing of the resins on subsequent rolls and printing equipment.

Another object of the invention is to reduce the moisture loss heretofore present in drying printing ink freshly coated on a printed web, by cooling the ink coating as a continuation of the drying operation, by impinging cool air on the printed web throughout the area thereof.

A further object of the invention is to prevent the redepositing of the resins on the rolls and printing equipment subsequent to a drying operation of the ink coating, by subjecting the printed web to an air cooling operation immediately succeeding and forming a continuation of the drying operation.

Still another object of the present invention is to improve upon the processes of color printing heretofore in use by eliminating the formation of a resin residue, by establishing a curtain of air at room temperature about a printed web immediately after drying of the web, and by then impinging cooled air on the web within the curtain of air.

A still further object of the invention is to provide a drying system for freshly printed webs by first drying the web to remove the volatile aliphatic petroleums from the web, and to then immediately cool the web by the impingement of cool air thereon to prevent the resins from turning fluid or plastic.

Still another object of the invention is to retard and contain the resin residue formed in the drying of a printed web by cooling the coated layer of printing ink on the web by impinging heated air thereon immediately after removing the carrying vehicle by heating.

A further object of the invention is to provide a novel and improved appartaus for cooling printed coatings as a part of a printing operation.

These and other objects of the invention will appear from time to time as the following specification proceeds and with reference to the accompanying drawing wherein:

FIGURE 1 is a block diagram showing certain steps in a color printing process including cooling steps retarding the formation of resin residues;

FIGURE 2 is a diagrammatic view in side elevation of a form of cooling hood that may be used in carrying out the system of the present invention; and FIGURE 3 is a diagrammatic bottom plan view of the cooling hood shown in FIGURE 2, and looking at the cooling hood substantially along lines III—III of FIGURE 2.

In the embodiment of the invention diagrammatically illustrated in the drawing, we have shown in block diagram a printing stage or station 10, which may be a letterpress, offset, flexographic, gravure, roll coat, reverse roll coat, plate coating, air knife, bar coating or curtain coating printing station of a conventional form. We have also shown a drying station 11 which may be in the form of a drying hood impinging heated air on the freshly printed web to volatilize the aliphatic petroleums in the ink coating, and have shown a cooling station 12 immediately succeeding the drying station.

We have further shown a next succeeeding printing station 10a for printing the dried web with a second color, where the process is a color printing process, a drying station 11a like the drying station 11 and a cooling station 12a, like the cooling station 12. Where the printing process is a three color process there will be a next succeeding printing station, drying station and cooling station (not shown) like the first and second printing, drying and cooling stations, applying an ink coating on the previously printed web of a third color in a conventional manner, and then drying and cooling the printed coating of the web.

The drying station 11 may be in the form of a conventional drying hood impinging heated air on the web at temperatures sufficiently high to volatilize the aliphatic petroleums, and drive off the petroleums from the web.

The cooling station 12 generally includes a cooling hood 15 extending along the web for the width thereof and spaced above a backup plate 16. As diagrammatically shown in FIGURE 2 a conveyor belt 17 extends along the top of the backup plate and conveys the web from the drying hood 11 beneath the cooling hood, and may transfer the cooled web to a second printing station 10a, where the printing process may be a color printing process.

While we have herein shown a conveyor belt 17 extending along the backing plate 16, the conveyor belt need not necessarily be used, and heated or cooled rolls may take the place of the backing plate. A roller conveyor or a vacuum conveyor or any other suitable form of backing means may be used to support the web during a cooling thereof and to transfer the web for further processing, such as the coating of different color thereon.

The cooling hood 15 is shown in FIGURES 2 and 3 as being generally rectangular in form having parallel end walls 18, side walls 19 and a top wall 20. Insulation 21 is shown as being contained within the end, top and side walls of the cooling hood. The cooling hood 15 is also shown as having an air distributing cooling plenum 23 mounted therein. The plenum 23 has parallel side walls 24 and end walls 25 parallel to the walls 18, 18 and 19 and spaced inwardly thereof to provide a peripheral air exhaust and curtaining channel or passageway 27 in the space between the hood 15 and the plenum 23. A supply duct 29 leads through the top wall 20 into the plenum 23 through the top thereof for supplying air under pressure to be discharged through an orifice plate 30 extending along the bottom of the plenum and spaced above the ink coated web, for impinging cool air on the web and cooling the ink coating thereon. The orifice plate 30 has a plurality of round orifices 31 leading therethrough. The orifices 31 may have rounded or tapered entering ends and may provide an open area of between 1% and 3.5% for distributing cool air on the ink coating on the surface of the web.

A desirable range of diameters of the orifices 31 is between ¼ and ⅝ inch with a preferred diameter of ⅜ inch. As previously mentioned, a ratio of hole or open area to total area of between 1% and 3.5% is satisfactory and a preferred open area is 1.5%.

The thickness of the orifice plate 30 may be of the order of ¼-inch, and the orifices 31 may be either extruded or drilled and extend over the entire area of the orifice plate and the printed coating on the web.

While we have herein shown a preferred form of orifice plate having round orifices, the orifices may be slotted or in the form of nozzles. With either alternate form of orifices, it is still desirable that the open area be from 1% to 3.5%.

A preferred spacing between the web and the orifice plate is 1 inch although the spacing may be from 1 to 6 inches in accordance with cooling conditions required.

An exhaust duct 32 leads through the top 20 of the hood 12 and has connection with the intake of an exhaust blower or fan 33. A damper 35 is provided in said exhaust duct to control the flow of air therethrough. The damper 35 may be remotely or manually operated in a conventional manner, which is no part of the present invention so need not herein be shown or described further.

A supply blower or fan 36 has communication with the supply duct 29 to supply cool air to the plenum 23 to be impinged on the printed coating on the web through the orifices 31. A conventional damper 37, which may either be manually operated or remotely operated by power, is provided in the supply duct 29.

The supply blower 36 may be of any conventional form and is provided to supply cooling air through the orifice plate 30. The cooling air may either be refrigerated air, air at room temperature, or outside air, depending upon the cooling conditions required. The air is usually refrigerated air, reduced to a sufficiently low temperature to immediately cool the resins in the ink below their fluid or plastic stage, and prevent the forming of a residue which may deposit on a next succeeding press platen or rolls, or other equipment required in the printing operation.

In the carrying out of the printing operation and particularly a color printing operation the web, sheet or article to be printed is first passed through the printing press 10 and under and along the drying hood 11 in a conventional manner. As the sheet or sheets pass under the drying hood, the ink coating is heated at a sufficiently high temperature to volatilize the aliphatic petroleums of the ink, by the impingement of air upon the traveling sheet. The air temperatures required to volatilize the aliphatic petroleums vary between 440 and 590° F. depending upon the constituency of the aliphatic petroleum carrier. The traveling sheet or web leaving the drying hood 11 immediately enters the cooling hood 20, where cool air is impinged directly on the web, to cool the ink coating thereon and to reduce the tendency of the resins and pigment in the ink coating to turn fluid or plastic. The cooled web may then pass to a second printing stage or station for printing a second color on the web, from which station the web is passed to a dryer station 11a and a cooling station 12a exactly like the cooling station 12. The web may then pass from the cooling station 12a to a third printing station (not shown) coating the web with a third color, after which the web is dried and cooled in the manner just described.

It may be seen from FIGURE 2 that the exhaust duct 32 draws in the spent air from the web or sheet through the peripheral passageway 27 extending about the entire area being dried, and also draws in air from the outside at room temperature through said peripheral passageway 27. This establishes an exterior air curtain about the inked coating on the sheet and thereby contains the cooling air to the inked coating and increases the effectiveness and speed of drying, to the extent required to maintain the resins in a solid state and to prevent the resins from redepositing on succeeding rolls or printing equipment.

It should further be noted that since the dried ink is immediately cooled, that the moisture content in the web is retained, and that the apparatus and system of the present invention besides materially improving the appearance of the finished sheet, also reduces the moisture loss, and remedies the problem of a bone dry sheet which due to its dryness has heretofore been difficult to handle in next succeeding printing operations.

It should further be understood that while we have described the present process for the coating of webs or sheets, which may be sheets of paper, that the process is effective for coating wood, metal, films of various types, textiles and various other articles or equipment with printing ink.

While we have herein shown and described one form in which the invention may be embodied, it may readily be understood that various variations and modifications in the invention may be attained without departing from the spirit and scope of the novel concepts thereof.

We claim as our invention:

1. An apparatus for retarding the moisture loss of printed webs and for cooling the resins and pigments of printing ink coatings on the webs to temperatures sufficiently low to prevent the resins and pigments from redepositing on succeeding printing platens comprising, a cooling hood adapted to extend along and across a printed web, a plenum within said hood and spaced inwardly of said hood, the space between said plenum and said hood forming a peripheral air passageway extending about the printed coating of the web, means withdrawing air from the web along said peripheral passageway and establishing an air curtain about the printing on the web, an orifice plate extending along the bottom of said plenum and having a series of orifices leading therethrough directed toward the web, and means supplying cooled air to said plenum for discharge through said orifice plate.

2. An apparatus for retarding the moisture loss of printed webs and cooling the resins and pigments of printed webs to temperatures sufficiently low to prevent the redepositing of the resins and pigments on succeeding press platens on the form of residue, comprising a cooling hood adapted to extend along and across a printed web and having parallel spaced side and end walls and a top wall extending across said side and end walls, an air exhaust duct leading through said top wall, a plenum supported within said hood and having parallel side and end walls parallel to said side and end walls of said hood and spaced inwardly therefrom, an orifice plate extending along the bottom of said plenum and having a plurality of orifices therein directing air from said plenum onto the printed coating on the web, an air supply duct leading through said hood and plenum through the top wall thereof, the space between said hood and plenum forming a peripheral air passageway, exhaust blower means exhausting air from said hood along said peripheral air passageway and establishing an air curtain, and supply blower means supplying cooled air through said supply duct into said plenum for impingement on the web within the margins of said air curtain.

3. An apparatus for retarding the moisture loss of printed webs and for cooling the resins and pigments of printing ink coatings on the webs to temperatures sufficiently low to prevent the resins and pigments from re-depositing on succeeding printing platens comprising, a cooling hood adapted to extend along and across a printed web, a plenum within said hood and spaced inwardly of the margins of said hood, the space between said plenum and said hood forming a peripheral air passageway extending about the printed coating of the web, an air exhaust duct leading from said hood, exhaust blower means connected with said air exhaust duct and exhausting air from said hood along said peripheral air passageway and establishing an air curtain about the printing on the web, an air supply duct having communication with said plenum, supply blower means supplying cooled air to said air supply duct, and orifice means defining the bottom portion of said plenum, within said air curtain, and directing cooled air onto the printed coating on the web within the margins of said air curtain.

References Cited by the Examiner

UNITED STATES PATENTS

| | | | |
|---|---|---|---|
| 1,399,415 | 12/1921 | Taliaferro | 34—62 |
| 1,808,476 | 6/1931 | Pinder | 101—416.1 |
| 1,867,256 | 7/1932 | Egli | 101—416 |
| 2,157,388 | 5/1939 | MacArthur | 34—13 |
| 2,210,032 | 8/1940 | Hess | 101—416 |
| 2,460,150 | 1/1949 | Schupp | 34—20 X |
| 3,071,870 | 1/1963 | Schnoring et al. | 34—13 X |

FREDERICK L. MATTESON, JR., *Primary Examiner.*

JOHN J. CAMBY, *Examiner.*